(12) United States Patent
Li et al.

(10) Patent No.: US 9,203,470 B2
(45) Date of Patent: Dec. 1, 2015

(54) ECHO CANCELLING SYSTEM AND METHOD FOR ON CHANNEL REPEATER USED FOR COVERAGE GAP FILLING

(75) Inventors: Wenhua Li, Changshu (CN); Jingsong Xia, Changshu (CN); Hongjun Li, Changshu (CN); Bowei Song, Changshu (CN); Yingying Fan, Changshu (CN)

(73) Assignee: ANYWAVE COMMUNICATION TECHNOLOGIES CO., LTD., Changshu (CN)

( * ) Notice: Subject to any disclaimer, the term of this patent is extended or adjusted under 35 U.S.C. 154(b) by 79 days.

(21) Appl. No.: 14/002,682

(22) PCT Filed: Mar. 14, 2011

(86) PCT No.: PCT/CN2011/071754
§ 371 (c)(1),
(2), (4) Date: Aug. 30, 2013

(87) PCT Pub. No.: WO2012/122698
PCT Pub. Date: Sep. 20, 2012

(65) Prior Publication Data
US 2013/0343437 A1 Dec. 26, 2013

(51) Int. Cl.
*H04B 3/36* (2006.01)
*H04B 3/23* (2006.01)
*H04B 7/155* (2006.01)

(52) U.S. Cl.
CPC .............. *H04B 3/23* (2013.01); *H04B 7/15585* (2013.01)

(58) Field of Classification Search
CPC .............................. H04B 3/23; H04B 7/15585
USPC .......................................................... 375/211
See application file for complete search history.

(56) References Cited

U.S. PATENT DOCUMENTS

| | | | |
|---|---|---|---|
| 7,254,198 B1 * | 8/2007 | Manickam et al. ............ 375/348 |
| 7,702,295 B1 * | 4/2010 | Nicholls et al. ................. 455/78 |
| 8,731,183 B1 * | 5/2014 | Goodson .................. H04B 3/23 |
| | | | 379/406.01 |
| 2011/0170473 A1 * | 7/2011 | Proctor et al. ................. 370/315 |
| 2011/0195704 A1 * | 8/2011 | Choi .................. H04W 72/1263 |
| | | | 455/423 |
| 2012/0002586 A1 * | 1/2012 | Gainey et al. ................. 370/315 |

* cited by examiner

*Primary Examiner* — Shuwang Liu
*Assistant Examiner* — David S Huang
(74) *Attorney, Agent, or Firm* — CBM Patent Consulting, LLC (57) ABSTRACT

An echo cancelling system and method for On Channel Repeater (OCR) used for coverage gap filling, which includes: a splitter, an echo cancellation module, a down-conversion module and a digital signal processor (DSP) module, which uses digital signal processing technologies to achieve a precise echo detection/estimation, and to cancel sufficient part of the echoes in analog domain. The invention may also remove residual echoes in digital domain as well, which is considered to be only a great supplement of the echo cancellation operation in analog domain.

4 Claims, 6 Drawing Sheets

ECHO CANCELLING SYSTEM AND METHOD FOR ON CHANNEL REPEATER USED FOR COVERAGE GAP FILLING

FIELD OF THE INVENTION

This invention is in broadcasting field, which is about an echo cancelling system and method for On Channel Repeater used for coverage gap filling

BACKGROUND OF THE INVENTION

With the rapid development of modern technology, new generations of broadcasting technologies have changed dramatically. For example, unlike the analog television, digital television broadcasting not only requires the stability of fixed reception, but also requires the same quality in mobile reception, such as via smartphones, or other hand-hold mobile receivers for real-time TV signals. This has raised a much higher standard towards the signal coverage and also the transmitted signal quality. However it's not easy for wireless or broadcasting network to establish a good coverage in every spot within a large area, because the coverage is limited by many factors, such as transmitted power from TV tower, size of coverage area, terrain obstacles for signals like being blocked by hills or mountains, or being reflected by lakes or seas, not to mention many man-made factors like skyscrapers and moving vehicles in cities. The transmitted signals can be greatly degraded by the multipath interference in all the above situations. Even with the increase of power level in a single transmitter, there may be still some areas which have insufficient signal strength or even are totally blind. Therefore, to improve signal coverage in those areas has become the main concern of network construction in the future.

By far the most common way is to use On Channel Repeater (OCR), which may also be called Gap filler. It's low cost and has a much easier and quicker installation when compared to adding an additional high power transmitter, or establishing a single frequency network (SFN), so it's a good way for coverage extension, especially for small areas. On Channel Repeater is a rebroadcast transceiver, which receives RF signals with a receiving antenna and then complete signal processing, such as to amplify the received signals, etc., and finally to use a transmitting antenna to retransmit the signals at the same frequency as it's received, towards those area with poor signal coverage. OCR has many advantages such as it has a simple structure, small delay and low cost, which makes it the perfect solution for directional coverage such as to roads, tunnels and subways, or communities and villages.

Due to the transmitting frequency and receiving frequency in an OCR are the same, it may probably cause a self-exciting oscillation. This is how it happens: if there is not enough isolation between the transmitting antenna and the receiving antenna, then the retransmitted signals are most likely to be received by the receiving antenna of the OCR again. This "unwanted" signals (we call them echoes in this invention), together with the "wanted" signals, which are supposed to be received and retransmitted, are to be amplified, then retransmitted via the transmitting antenna. These echoes make a closed loop in the OCR therefore it causes the instability and relaxation oscillations. In order to avoid a self-exciting oscillation, usually some physical isolation methods are adopted during the initial design and implementation of projects, such as the use of distance difference, altitude difference, or the height ratio and polarization difference of receiving and transmitting antennas. However these physical ways usually greatly increase the difficulty of the engineering design and construction cost, and what's worse, sometimes it still cannot create sufficient isolation purely by all the physical ways mentioned above.

Figure 1:
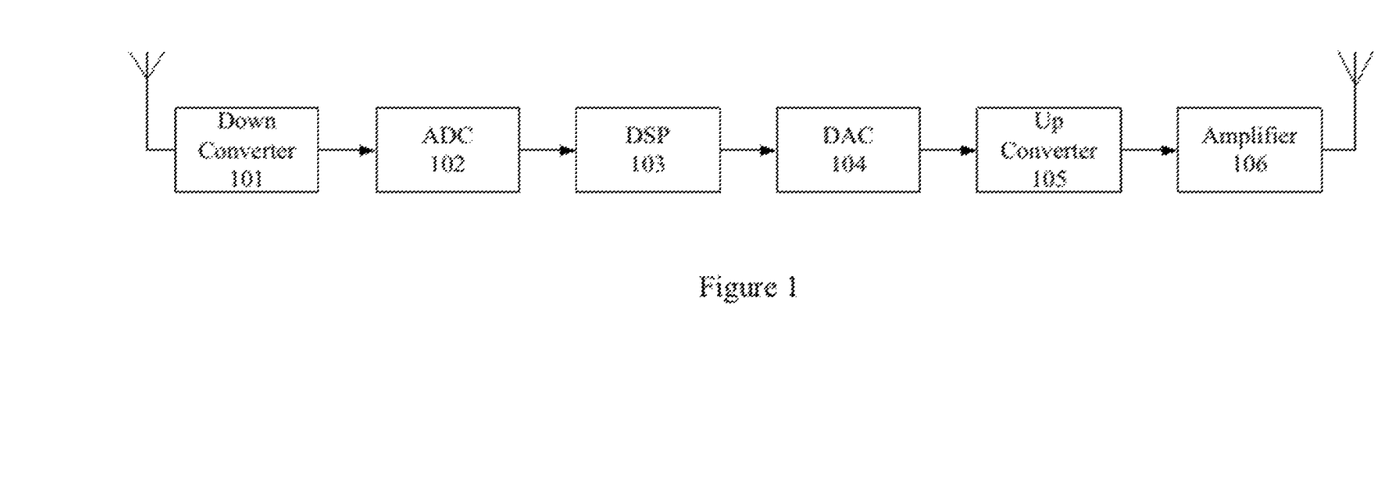
FIG. 1 is a block diagram of a traditional echo cancellation system.

Echo cancellation technologies are then introduced in order to make up for the insufficiency of physical isolation. Although there are various of echo channel estimation and cancellation methods, they are similar in terms of general structure: the OCR receives mixed signals which consist of "wanted" signals and echoes, then it down converts the mixed signals to baseband or low IF and converts them to digital signals. After that it uses digital signal processing technologies to complete echo estimation and echo cancellation. Finally after echoes are substantially eliminated, it converts the signals back to be analog, up converts them to the same frequency as it's received, amplify them, and retransmit them via a transmitting antenna, as shown in FIG. 1.

A Chinese patent whose application number is 200810106326.7, "An Echo Cancelling Apparatus and its Echo Cancellation Method", is used in mobile multimedia broadcasting field. Its feature is that it does not use any training sequence for echo channel estimation; therefore it does not bring in extra noise which may degrade the performance of receivers. But its essence in the structure is similar to other echo cancellation technologies: they first down convert the mixed signals to baseband and then use digital signal processing for echo estimation and echo cancellation. In all other inventions which have similar structure, as shown in FIG. 1, the echo cancellation performance is not only affected by the method used for echo detection and cancellation, by also greatly limited by the dynamic range of the ADCs they uses. Let's say they use a 10-bit ADC in OCR, which is commonly used in the field, and its valid dynamic range is only 50 dB. If echo level is 30 dB higher than the wanted signals, then even the apparatus can detect and eliminate most of the echoes precisely, the remaining wanted signals have a valid range of only 20 dB, while all the other parts are just noise. And after frequency up conversion and power amplification, the quality of retransmitted signals is to get worse. These signals of poor quality retransmitted by an OCR will greatly degrade the performance of receivers. However since the deterioration is done in analog domain caused by the limited dynamic range of the ADC, it cannot be recovered by any simple digital signal processing technologies in digital domain which means the moment these signals are converted from analog to digital, the damage is done and irreversible. To replace the regular ADC with a higher resolution one which has higher dynamic range (e.g., from 10-bit to 14-bit) may help to relieve the problem in theory, but all come with it is a much higher cost, more power consumption and less generality, and the improvement is very limited in some cases.

BRIEF DESCRIPTION OF THE INVENTION

To better solve the self-exciting oscillation problem in OCR, this invention provides an echo cancelling system and method which is used in OCR for coverage gap filling. This main feature of this invention is to use analog devices and analog operations in the analog domain to eliminate strong echoes (unwanted signals) from received RF signals (the input of OCR) before the RF signals enter the ADC for further digital signal processing. That's why it is different from all the other existing technologies, which depend entirely on digital signal processing technology in digital domain to complete the echo cancellation. This invention uses digital signal processing technologies to achieve a precise echo detection/estimation, and to remove residual echoes in digital domain as well, which is considered to be a great supplement of what has been done in analog domain. In short, this invention provides a system and its method which work as a "combination": to use digital technology for echo estimation/detection but to cancel most part of the echoes in analog domain. Therefore it prevents the strong echoes from saturating the ADC, and also takes advantage of maturity and accuracy of modern digital signal processing technology; it has the advantages of compact structure, excellent performance, and easy implementation.

This invention is described as follows:

This invention provides an echo cancelling system which is used in OCR for coverage gap filling. The main part of the system includes: a splitter, an echo cancellation module, a down-conversion module and a digital signal processor (DSP) module. The splitter receives mixed signals from a receiving antenna. These RF signals are composed of echoes and wanted signals, and are divided equally into two paths: one is applied to the echo cancellation module and the other is applied to the down conversion module. The echo cancellation module receives RF signals from the splitter, and its output are signals among which most of echoes have been eliminated in analog domain, and after that they are converted to digital signals and applied to the DSP module. The down conversion module mainly down-converts the output of the splitter from RF to baseband and then converts them to digital format, finally these digital baseband signals are applied to the DSP module as well. The DSP module receives digital baseband signals from the down conversion module and performs echo detection/estimation, and then it outputs estimated echoes back to the input of the echo cancellation module. The DSP module also accepts signals from echo cancellation module and performs a more precise echo cancellation to eliminate residual echoes in digital domain before they are finally retransmitted.

Figure 2:
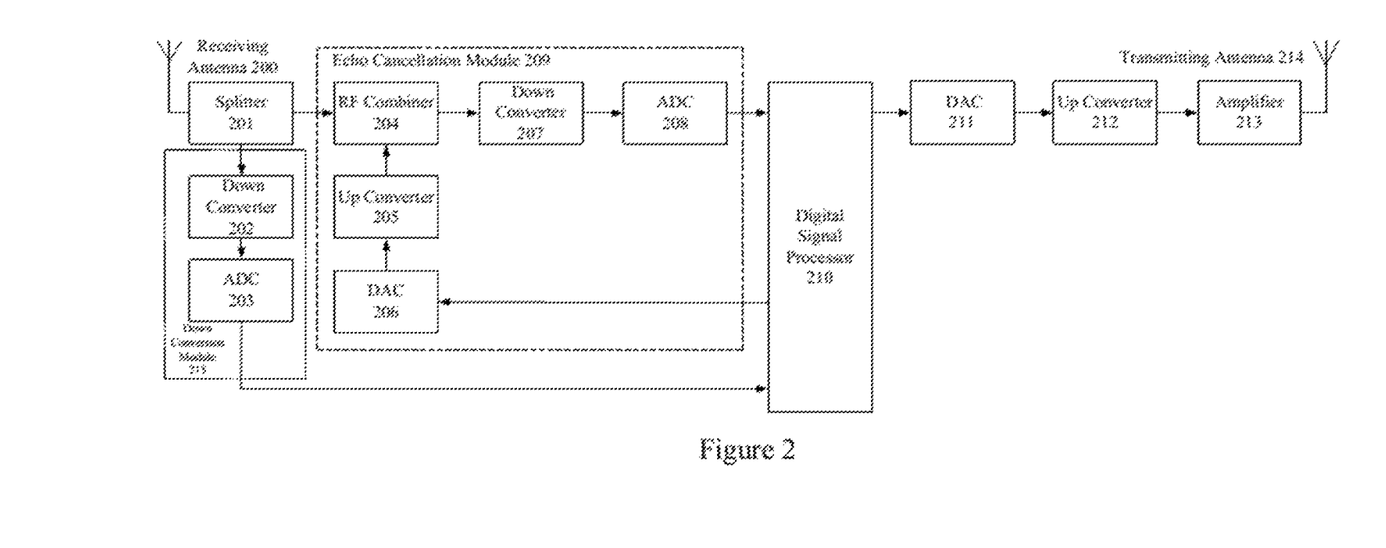
FIG. 2 is a block diagram of an example of this invention which cancels the coarse echo at RF frequency in analog domain.
Figure 3:
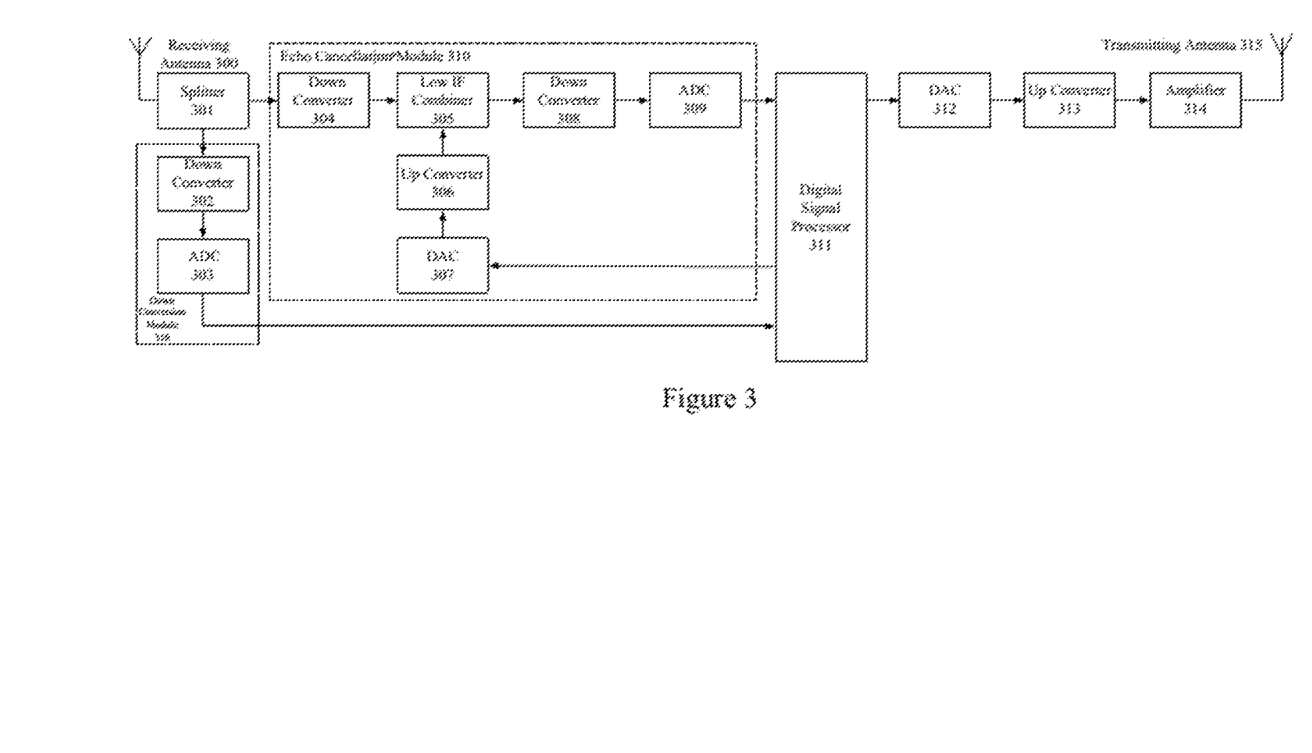
FIG. 3 is a block diagram of an example of this invention which cancels the coarse echo at low IF frequency in analog domain.
Figure 4:
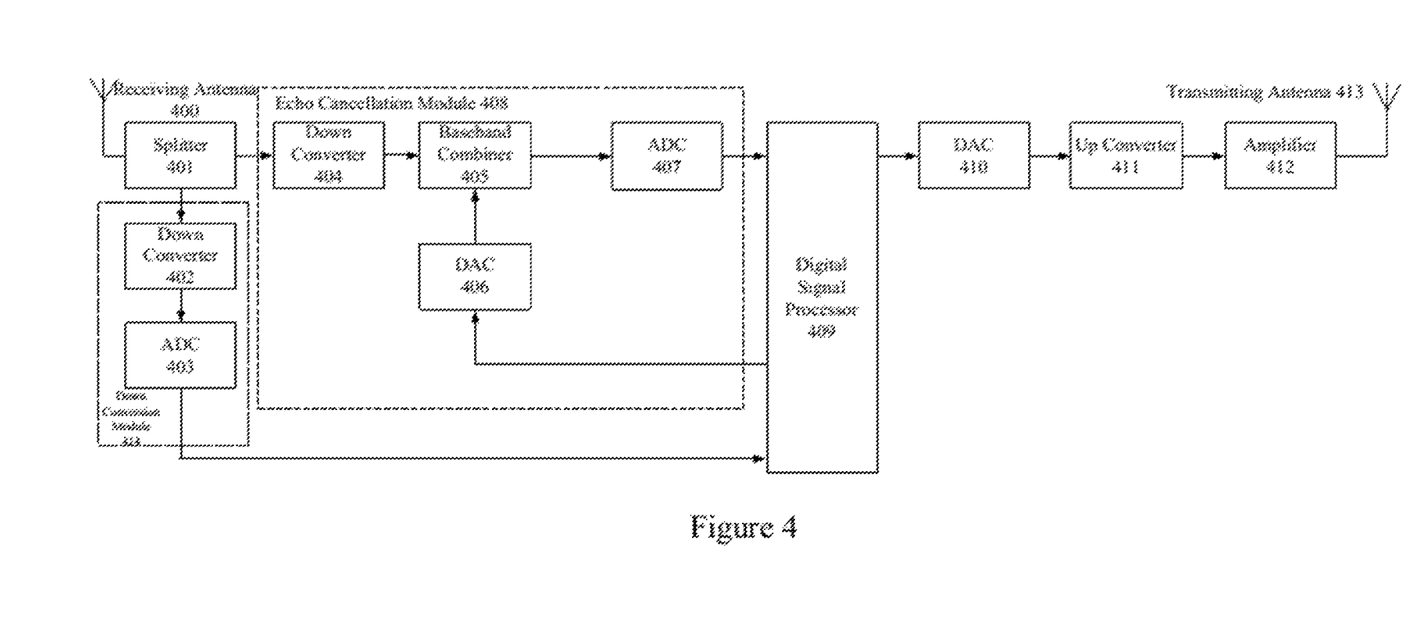
FIG. 4 is a block diagram of an example of this invention which cancels the coarse echo at baseband in analog domain.

The foregoing echo cancellation module can be achieved by any of the following structures:

a) The first structure is shown as FIG. 2. The echo cancellation module 209 consists of a RF combiner 204, an up converter 205, a digital-to-analog converter (DAC) 206, a down converter 207, and an ADC 208. The DAC 206 receives digital estimated echoes from the DSP module 210, and converts them to analog signals, then applies them to the up converter 205. The up converter 205 receives analog estimated echoes from the DAC 206 and coverts them from baseband to RF in frequency domain, and then applies them to the RF combiner 204. The RF combiner 204 receives mixed signals from the splitter 201, and also estimated echoes from the up converter 205. It subtracts the estimated echoes from the mixed signals, and then applies the output signals to the down converter 207. The down converter 207 mainly down converts the input signals from RF to baseband in frequency domain and then applies them to the ADC 208, which converts these signals from analog to digital format and then applies them to the DSP module 210.

b) A second structure is shown as FIG. 3. The echo cancellation module 310 consists of a down converter 304, a low IF combiner 305, an up converter 306, a DAC 307, another down converter 308, and an ADC 309. The DAC 307 receives digital estimated echoes from the DSP module 311, and converts them to analog signals, then applies them to the up converter 306. The up converter 306 receives analog estimated echoes from the DAC 307 and converts them from baseband to low IF in frequency domain, and then applies them to the low IF combiner 305. The low IF combiner 305 receives low IF mixed signals from the down converter 304, and also the estimated low IF analog echoes from the up converter 306. It then subtracts the estimated echoes from the mixed signals at low IF frequency, and applies its output signals to the down converter 308. The down converter 308 mainly down converts its input from low IF to baseband in frequency domain and then applies them to the ADC 309, which converts these signals from analog to digital format and then applies them to the DSP module 311.

c) A third structure is shown as FIG. 4. The echo cancellation module 408 consists of a down converter 404, a baseband combiner 405, a DAC 406, and an ADC 407. The DAC 406 receives digital estimated echoes from the DSP module 409, and converts them to analog signals, then applies them to the baseband combiner 405. The baseband combiner 405 receives baseband mixed signals from the down converter 404 and also the estimated baseband analog echoes from DAC 406. It then subtracts the estimated echoes from the mixed signals in baseband, and applies its output signals to the ADC 407, which converts these signals from analog to digital format and then applies them to the DSP module 409.

Figure 5:
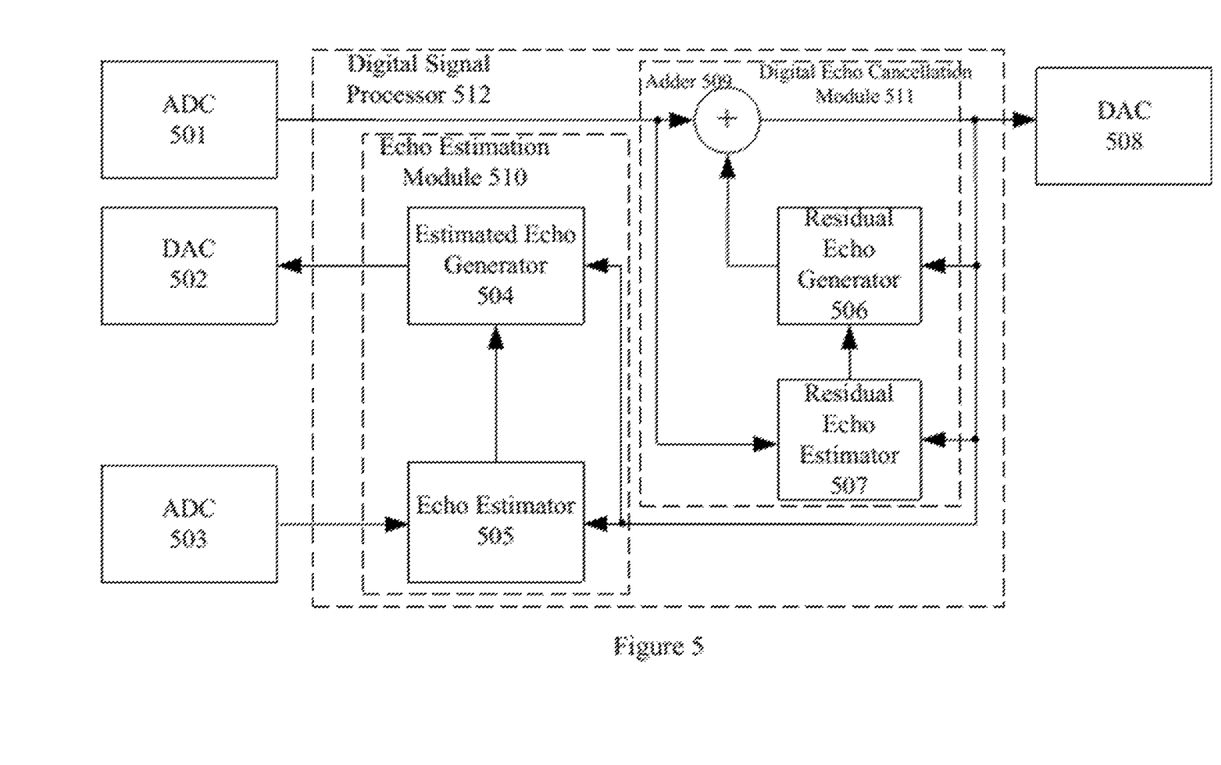
FIG. 5 is a block diagram of the DSP module in this invention

The foregoing DSP module 512 consists of an echo estimation module 510 and a digital echo cancellation module 511, as shown in FIG. 5. The digital echo cancellation module 511 receives digital baseband signals from the ADC 501, among which most echoes have been eliminated in analog domain, and then it detects and eliminates residual echoes from its input signals in digital domain, and applies the results (the "clean" signals) both to the echo estimation module 510 and the DAC 508. The echo estimation module 510 receives mixed signals from the ADC 503 and the "clean" signals from the digital cancellation module 511, then generates estimated echoes and applies them to the DAC 502, which converts them to analog signals for echo cancellation in analog domain.

The foregoing echo estimation module 510 consists of an echo estimator 505 and an estimated echo generator 504. The echo estimator 505 receives mixed signals from the ADC 503 and also the "clean" signals from the digital cancellation module 511 and then outputs the estimated echo channel to the estimated echo generator 504. The estimated echo generator 504 also receives the "clean" signals from the digital cancellation module 511, therefore it outputs estimated digital echoes to the DAC 502 which converts the signals to analog format for echo cancellation in analog domain.

The foregoing digital echo cancellation module 511 aims at eliminating residual echoes in digital domain using modern digital processing technologies. It consists of an adder 509, a residual echo generator 506 and a residual echo estimator 507. The adder 509 receives digital baseband signals from the ADC 501, among which most echoes have been eliminated in analog domain, and estimated residual echoes from the residual echo generator 506, and then it subtracts the estimated residual echoes from the digital baseband signals from the ADC 501, and applies the output signals to the DAC 508. The residual echo generator 506 receives the "clean" signals from the adder 509, and also the estimated channel from the residual echo estimator 507, then generates the estimated residual echoes and sends them to the subtractive or inverting input of the adder 509. The residual echo estimator 507 also receives the "clean" signals which are to be retransmitted and the output signals of the ADC 501, then generates the estimated channel of residual echoes and sends them to the residual echo generator 506 for residual echo generation.

This invention provides an echo cancelling method based on the foregoing system which is used in OCR for coverage gap filling, including the following steps:

a) A receiving antenna of OCR receives mixed signals which are composed of echoes and "wanted" signals, and applies them to a splitter. The splitter divides the mixed signals equally into two paths. The signals, to be referred to as "$R_x$", are the same in contents and levels in both paths.

b) One output from the splitter is sent to a down conversion module. In the down conversion module, the mixed signals "$R_x$" are first down converted to baseband, and then converted from analog to digital format, which are to be referred to as "X", and then sent to a DSP module, by which signals "X" are to be used to get estimated coarse echoes "E" in digital domain.

c) The digital coarse echoes "E" are converted to analog signals by a DAC, and then according 3 different structures as mentioned above, they can be converted to either RF frequency, or low IF frequency, or remain at baseband, and then be subtracted from the mixed analog signals by a RF combiner, or a low IF combiner, or a baseband combiner accordingly, therefore the coarse echo cancellation is accomplished in analog domain.

d) The output signals of the forgoing combiner, as referred to "$T_{xx}$", are converted by an ADC to digital format first, and then sent to the digital echo cancellation module in the DSP module. The digital echo cancellation module may receive the signals and use modern digital signal processing technologies to accomplish the residual echo estimation and cancellation, and then outputs the "clean" signals "$T_x$" to a DAC, which converts them to analog signals that are up converted, amplified, and finally retransmitted via transmitting antenna. It also applies the signals "$T_x$" to the echo estimation module for coarse echo estimation which are sent to another DAC for echo cancellation in analog domain. The digital echo cancellation module may also keep its input untouched and pass them through directly to a DAC for retransmission and to the echo estimation module for coarse echo estimation. In this case, signals "$T_x$" equal to the digital format of "$T_{xx}$".

This invention provides a brand new echo cancellation system which is different from the traditional echo cancellation systems in essential structure. The traditional systems used in OCR mainly do the echo cancellation in digital domain after the mixed signals are converted in digital signals by an ADC. Therefore it's most likely that the ADC don't have enough dynamic range left to the wanted signals when the echoes are much stronger than the wanted signals. However this invention provides a way to eliminate most of the echoes in analog domain before they are sent to the ADC, therefore it greatly reduces the possibility of saturating ADC's dynamic range. The echo cancellation in analog domain can be done at either RF frequency, or low IF frequency, or baseband, while the echo estimation is still carried out in digital domain. There are a lot of advantages of this invention. One is users don't have to worry about the dynamic range of ADC, or no need to replace it with a much more expensive device which has more bits and higher resolution. Another is though it eliminates coarse echoes in analog domain, it still fully takes advantage of the merits of modern digital processing technologies, by doing all echo estimation, both for coarse echoes and residual echoes in digital domain, and also performing residual echo cancellation in digital domain if a better signal quality is required.

DETAILED DESCRIPTION OF THE PREFERRED EMBODIMENTS

The embodiments are described in more details below in order to explain this invention. This invention is not to be limited in scope by the embodiments disclosed herein, which are intended as single illustrations of individual aspects of the invention, and any that are functionally equivalent are within the scope of the invention. Various modifications to the models and methods of the invention, in addition to those described herein, will become apparent to those skilled in the art from the foregoing description and teachings, and are similarly intended to fall within the scope of the invention. Such modifications or other embodiments can be practiced without departing from the true scope and spirit of the invention.

The First Embodiment

Referring to FIG. 2, the first embodiment is composed of a splitter 201, an echo cancellation module 209, a down-conversion module 215 and a DSP module 210. The splitter 201 receives mixed signals from the receiving antenna 200. These RF signals are composed of echoes and wanted signals, and are divided equally into two paths: one is applied to the echo cancellation module 209 and the other is applied to the down conversion module 215. The echo cancellation module 215 receives RF signals from the splitter 201, and its output are signals among which most of echoes have been eliminated when they are still in analog domain, and after that they are converted to digital signals and applied to the DSP module 210. The down conversion module 215 mainly down-converts the RF signals from splitter to baseband and then converts them to digital format, finally these digital baseband signals are applied to the DSP module 210. The DSP module 210 receives digital baseband signals from the down conversion module 215 and performs echo detection/estimation, and then it outputs estimated echoes back to the input of the echo cancellation module 209. The DSP module 210 also accepts signals from echo cancellation module 209 and performs a more precise echo cancellation to eliminate residual echoes in digital domain before they are finally retransmitted.

The foregoing splitter used in FIG. 2 can be a common RF splitter.

Referring to FIG. 2, the echo cancellation module 209 of this embodiment is composed of a RF combiner 204, an up converter 205, a digital-to-analog converter (DAC) 206, a down converter 207, and an ADC 208. The DAC 206 receives digital estimated echoes from the DSP module 210, and converts them to analog signals, then applies them to the up converter 205. The up converter 205 receives analog estimated echoes from the DAC 206 and coverts them from baseband to RF in frequency domain, and then applies them to the RF combiner 204. The RF combiner 204 receives mixed signals from the splitter 201, and estimated echoes from the up converter 205. It subtracts the estimated echoes from the mixed signals, and then applies the output signals to the down converter 207. The down converter 207 mainly down converts the input signals from RF to baseband in frequency domain and then applies them to the ADC 208, which converts these signals from analog to digital format and then applies them to the DSP module 210.

The foregoing down converter 207 and up converter 205 in FIG. 2 can use either direct conversion or double conversion architecture.

Referring to FIG. 5, the foregoing DSP module 512 consists of an echo estimation module 510 and a digital echo cancellation module 511. The digital echo cancellation module 511 receives digital baseband signals from the ADC 501, among which most echoes have been eliminated in analog domain, and then it detects and eliminates residual echoes from its input signals in digital domain, and applies the output (the "clean" signals) to the echo estimation module 510 and the DAC 508. The echo estimation module 510 receives mixed signals from ADC 503 and also the "clean" signals from the digital cancellation module 511, then generates estimated echoes and applies them to the DAC 502 which converts them to analog signals for echo cancellation in analog domain.

Figure 6:
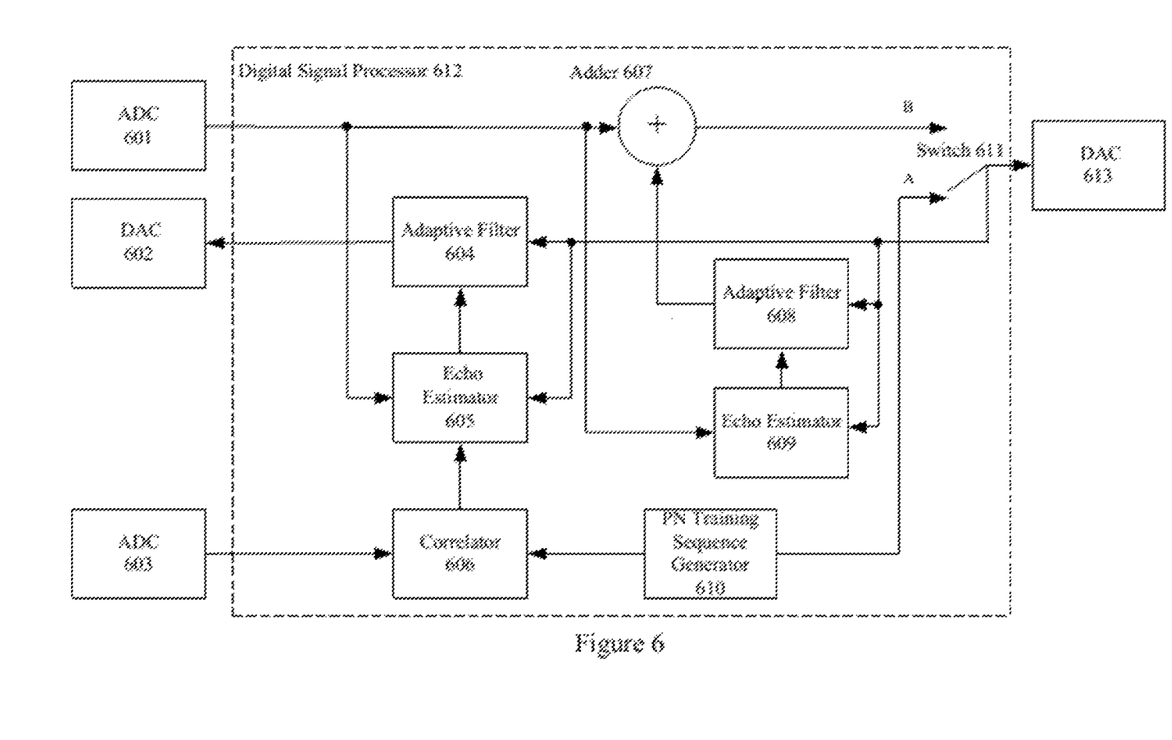
FIG. 6 is a detailed block diagram of echo estimation module and digital echo cancellation module in DSP.

Referring to FIG. 5 and FIG. 6, the foregoing echo estimation module 510 consists of an echo estimator 505 and an estimated echo generator 504. The echo estimator 505 receives mixed signals from the ADC 503 and also the "clean" signals from the digital cancellation module 511 and then outputs estimated echo channel to the estimated echo generator 504. The estimated echo generator 504 also receives the "clean" signals from the digital cancellation module 511, and then it outputs estimated digital echoes to the DAC 502 which converts them into analog format for echo cancellation in analog domain.

The foregoing echo estimator 505 can be achieved by asynchronous correlating, or by the least mean square (LMS) method, or the combination of both.

The foregoing estimated echo generator 504 can be achieved by an adaptive filter. The coefficients of the filter are provided by the echo estimator 505. The "clean" signals from the output of adder 509 applies to this filter, and the filter generates estimated echoes and applies them to the DAC 502, which converts the signals from digital to analog for echo cancellation operations in analog domain.

The foregoing digital echo cancellation module 511 aims at eliminating residual echoes in digital domain using modern digital processing technologies. It consists of an adder 509, a residual echo generator 506 and a residual echo estimator 507. The adder 509 combines digital baseband signals from the ADC 501, among which most echoes have been eliminated in analog domain, and estimated residual echoes from the residual echo generator 506. The output of the adder 509, as the foregoing "clean" signals, applies to the DAC 508. It also applies the "clean" signals to the input of the residual echo generator 506, which are used together with the estimated channel from the residual echo estimator 507 and finally generates the estimated residual echoes and sends them to the subtractive or inverting input of the adder 509. The "clean" signals also applies to the residual echo estimator 507, which are used together with one of the inputs of the adder 509, which are from the ADC 501, to generate estimated residual echo channel which is sent to the residual echo generator 506 for residual echo generation.

The foregoing residual echo estimator 507 can be achieved by asynchronous correlating, or by the least mean square (LMS) method, or the combination of both.

The foregoing residual echo generator 506 can be achieved by an adaptive filter. The coefficients of the filter are provided by the residual echo estimator 507. The output of adder 509 applies to this filter, and the filter generates estimated residual echoes and applies them to the subtractive or inverting input of adder 509 to eliminate the residual echoes.

This embodiment provides an echo cancelling method based on the foregoing system which is used in OCR for coverage gap filling, including the following steps:

a) A receiving antenna of OCR receives mixed signals which are composed of echoes and "wanted" signals, and applies them to a splitter. The splitter divides the mixed signals equally into two paths. The signals, to be referred to as "$R_x$", are the same in contents and levels in both paths.

b) One output from the splitter is sent to a down conversion module. In the down conversion module, signals "$R_x$" are first down converted to baseband and then converted from analog to digital signals, which are to be referred to as "X", and then sent to a DSP module, by which signals "X" are to be used to get estimated coarse echoes "E" in digital domain. More details are as shown below:

b.1) In the down conversion module, the received signals "$R_x$" from the splitter are converted to baseband signals "$R_N$" by a down converter which may have either direct conversion or double conversion architecture, then signals "$R_N$" are applied to an ADC, which converts them from analog signals to digital signals (referred to as "X") and applies signals "X" to an echo estimator in the DSP module.

b.2) The echo estimator in the DSP module receives the digital baseband signals "X", and also the "clean" signals (referred to as "$T_x$") which are to be used for retransmission, then it can use any existing digital echo estimation methods to get an estimation of echo channel (referred to as "H"), and send channel "H" to an estimated echo generator which is also in echo estimation module of the DSP module.

b.3) The estimated echo generator uses the "clean" signals "$T_x$" and the estimated echo channel "H" to generate the estimated coarse echoes "E" which are to be sent to a DAC for coarse echo cancellation operation in analog domain.

c) The digital coarse echoes "E" are converted to analog signals by a DAC, and then according different structures as mentioned above, they can be converted to either RF frequency, or low IF frequency, or remain at baseband, and then be subtracted from the mixed analog signals by a RF combiner, or a low IF combiner, or a baseband combiner accordingly, by which the coarse echo cancellation is accomplished in analog domain. In this embodiment, the echo cancellation is done at RF frequency.

d) The output signals of the forgoing combiner, as referred to "$T_{xx}$", are converted by an ADC to digital signals first, and then sent to the digital echo cancellation module in the DSP module. The digital echo cancellation module may receive the signals and use modern digital signal processing technologies to accomplish the residual echo estimation and cancellation, and then outputs the "clean" signals "$T_x$" to a DAC, which converts them to analog signals that are then up converted, amplified, and finally retransmitted via a transmitting antenna. It also applies the signals "$T_x$" to the echo estimation module for coarse echo estimation which are sent to another DAC for echo cancellation in analog domain. The digital echo cancellation module may also keep its input untouched and pass them through directly to the DAC for retransmission and to the echo estimation module for coarse echo estimation. In that case, signals "$T_x$" equal to the digital format of "$T_{xx}$".

The Second Embodiment is Described Below

The second embodiment of the echo cancellation module is shown as FIG. 3. The echo cancellation module consists of a down converter 304, a low IF combiner 305, an up converter 306, a DAC 307, another down converter 308, and an ADC 309. The DAC 307 receives digital estimated echoes from DSP module 311, and converts them to analog signals, then applies them to the up converter 306. The up converter 306 receives analog estimated echoes from the DAC 307 and converts them from baseband to low IF in frequency domain, and then applies them to the low IF combiner 305. The low IF combiner 305 receives the low IF mixed signals from down converter 304, and also the estimated low IF analog echoes from the up converter 306. It then subtracts the estimated echoes from the mixed signals at low IF frequency, and applies its output signals to the down converter 308. The down converter 308 mainly down converts its input from low IF to baseband and then applies them to the ADC 309, which converts these signals from analog to digital format and then applies them to the DSP module 311.

The Third Embodiment is Described Below

A third embodiment of the echo cancellation module is shown as FIG. 4. The echo cancellation module consists of a down converter 404, a baseband combiner 405, a DAC 406, and an ADC 407. The DAC 406 receives digital estimated echoes from the DSP module 409, and converts them to analog signals, then applies them to the baseband combiner 405. The baseband combiner 405 receives baseband mixed signals from the down converter 404, and also the estimated baseband analog echoes from DAC 406. It then subtracts the estimated echoes from the mixed signals in baseband, and applies its output signals to the ADC 407, which converts these signals from analog to digital format and then applies them to the DSP module 409.

All other current echo cancellation systems are similar in essential structure: they first convert the received signals from analog to digital format and then use digital signal processing technologies for echo estimation and echo cancellation in digital domain. Let's say there is an effective method which can cope with a parasitic echo-to-wanted signal ratio of up to 30 dB, then if a common 10-bit ADC is used in this system, whose dynamic range is only about 50 dB. Then after the analog-to-digital conversion, the wanted signals have less than 20 dB valid range, which is because the whole range of ADC is 50 dB and echoes are 30 dB higher than the wanted signals. After the up-converter and amplifier, the quality of retransmitted signals is even worse. This signals of poor quality retransmitted by an OCR will greatly degrade the performance of receivers, which leads to the result that though the received signal strength may have been improved by an OCR, but the received signal quality has greatly deteriorated, which makes all the efforts of echo cancellation and gap filling meant for a better coverage, a rather non-practical application.

This invention provides a system and its method which work as a "combination": to use digital technology for echo estimation/detection and to cancel most part of the echoes in analog domain. In the analog part, because the system cancels most part of echoes in analog domain before they enter an ADC, therefore the wanted signals can utilizes the full range of the ADC without being occupied by strong echoes. By applying this invention, the received mixed signals are most unlikely to saturate a commonly used ADC, so the system does not require a higher accuracy one. And in the digital part, it fully takes advantage of the merits of digital technologies for echo estimation, and for the residual echo elimination if a better signal quality is required. The combination of analog operation and digital processing guarantee the precision of echo estimation/cancellation and high dynamic range of "wanted" signals at the same time, which are of great significance to OCR used for coverage gap filling.

What is claimed is:

1. An echo cancelling system for On Channel Repeater used for coverage gap filling comprising:
    a splitter, an echo cancellation module, a down-conversion module and a digital signal processor (DSP) module;
    wherein the splitter receiving mixed RF signals which are composed of echoes and wanted signals from a receiving antenna, and separating the mixed signals equally into two paths: one is applied to the echo cancellation module, and the other is applied to the down conversion module;
    the echo cancellation module receiving mixed RF signals from the splitter, and receiving estimated echoes from the DSP module, then the echo cancellation module eliminating echoes from the mixed RF signals; and converting the resulting echo-canceled mixed RF signals into digital baseband signals and exporting to the DSP module;
    the down conversion module receiving mixed RF signals from the splitter and down converting the mixed RF signals from RF frequency to mixed baseband signals, after that the down conversion module converting the mixed baseband signals from analog to digital format, and exporting to the DSP module;
    the DSP module receiving the digital mixed baseband signals from the down conversion module, performing echo detection/estimation, and exporting the estimated echoes to the echo cancellation module; the DSP module also receiving the digital baseband signals from the echo cancellation module and performing a more precise echo cancellation to eliminate residual echoes in the digital domain before these signals are finally retransmitted.

2. The echo cancelling system according to claim 1, wherein the foregoing DSP module comprising:
    an echo estimation module and a digital echo cancellation module;
    the digital echo cancellation module receiving the digital baseband signals from a first analog-to-digital converter (ADC) of the echo cancellation module, among which most echoes have been eliminated in the analog domain, and the digital echo cancellation module detecting and eliminating residual echoes from its input signals in the digital domain, and applying the output (the "clean" signals) to the echo estimation module, and also to a first digital-to-analog converter (DAC) for retransmission;
    the echo estimation module receiving mixed baseband signals from a second ADC of the down conversion module and the "clean" signals from the digital cancellation module, then generating estimated echoes and applying them to a second DAC which converts them into analog signals for echo cancellation in the analog domain.

3. The echo cancelling system according to claim 2, wherein the echo estimation module comprising:
    an echo estimator and an estimated echo generator;
    the echo estimator receiving the digital mixed baseband signals from the second ADC and the "clean" signals from the digital cancellation module, and exporting an estimated echo channel to the estimated echo generator;
    the estimated echo generator receiving the "clean" signals from the digital cancellation module, and the estimated echo channel from the echo estimator, and exporting the estimated digital echoes to the second DAC which converts them into analog signals for echo cancellation in the analog domain.

4. The echo cancelling system according to claim 2, wherein the digital echo cancellation module comprising:
- an adder, a residual echo generator and a residual echo estimator;
- the adder combining digital baseband signals from the first ADC, among which most echoes have been eliminated in analog domain, and estimated residual echoes from the residual echo generator; then applying the output, referred as "clean" signals, to the first DAC, the residual echo generator and the residual echo estimator;
- the residual echo generator using the "clean" signals from the adder, together with an estimated channel from the residual echo estimator, and generating the estimated residual echoes and sending them to a subtractive or inverting input of the adder;
- the residual echo estimator using the "clean" signals from the adder, together with the digital baseband signals, to generate the estimated residual echo channel which is sent to the residual echo generator for residual echo generation.

\* \* \* \* \*